(12) United States Patent
Bülow et al.

(10) Patent No.: US 6,271,922 B1
(45) Date of Patent: Aug. 7, 2001

(54) TRANSMISSION SYSTEM AND ASSOCIATED METHOD FOR MEASURING INTERFERENCE EFFECTS OF GLASS FIBER TRANSMISSION LINKS

(75) Inventors: Henning Bülow, Stuttgart; Harald Schmuck, Korntal-Münchingen, both of (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/335,903

(22) Filed: Jun. 18, 1999

(30) Foreign Application Priority Data

Jun. 20, 1998 (DE) ................................. 198 27 638

(51) Int. Cl.$^7$ ...................................... G01B 9/02
(52) U.S. Cl. ................... 356/477; 356/484; 356/73.1
(58) Field of Search ................... 356/73.1, 484, 356/477; 250/227.19, 227.17, 227.27; 385/12

(56) References Cited

U.S. PATENT DOCUMENTS

| | | |
|---|---|---|
| 4,523,847 | 6/1985 | Bjorklund et al. ................ 356/484 |
| 4,750,833 | * 6/1988 | Jones .................................... 356/73.1 |
| 5,010,587 | 4/1991 | Eklund ...................................... 372/32 |
| 5,473,357 | 12/1995 | Shirakawa et al. . |
| 5,473,457 | 12/1995 | Ono ........................................ 385/11 |
| 5,557,694 | 9/1996 | Veith et al. . |
| 5,852,496 | * 12/1998 | Gisin et al. ........................... 356/73.1 |

FOREIGN PATENT DOCUMENTS

| | | |
|---|---|---|
| 44 110 63 A1 | 10/1995 | (DE) . |
| 196 12 604 A1 | 10/1997 | (DE) . |
| 197 12 768 A1 | 11/1997 | (DE) . |
| 195 38 224 C2 | 4/1998 | (DE) . |
| 197 24 676 A1 | 1/1999 | (DE) . |
| 2 738 634 A1 | 3/1997 | (FR) . |
| 2 131 567 | 6/1984 | (GB) . |
| 2 246 858 | 2/1992 | (GB) . |
| WO 97/02476 | 1/1997 | (WO) . |

OTHER PUBLICATIONS

Henning Bulow et al, Equalization of Bit Distortion Induced by Polarization Mode Dispersion, Proceedings II, NOC '97, Antwerp, pp. 65–72.

"Polarization–mode dispersion mandate computation and control" Lightwave, Sep. 1996, pp. 43–47.

* cited by examiner

*Primary Examiner*—Samuel A. Turner
(74) *Attorney, Agent, or Firm*—Sughrue, Mion, Zinn, Macpeak & Seas, PLLC

(57) ABSTRACT

A method for measuring interference effects on a glass fiber transmission link produced by polarization mode dispersion, whereby an optical light source feeds a side band modulated signal into the transmission link, the signal is transmitted and at a coherent receiver the signal is evaluated at a frequency corresponding to the modulation frequency of the side band modulated signal.

15 Claims, 1 Drawing Sheet

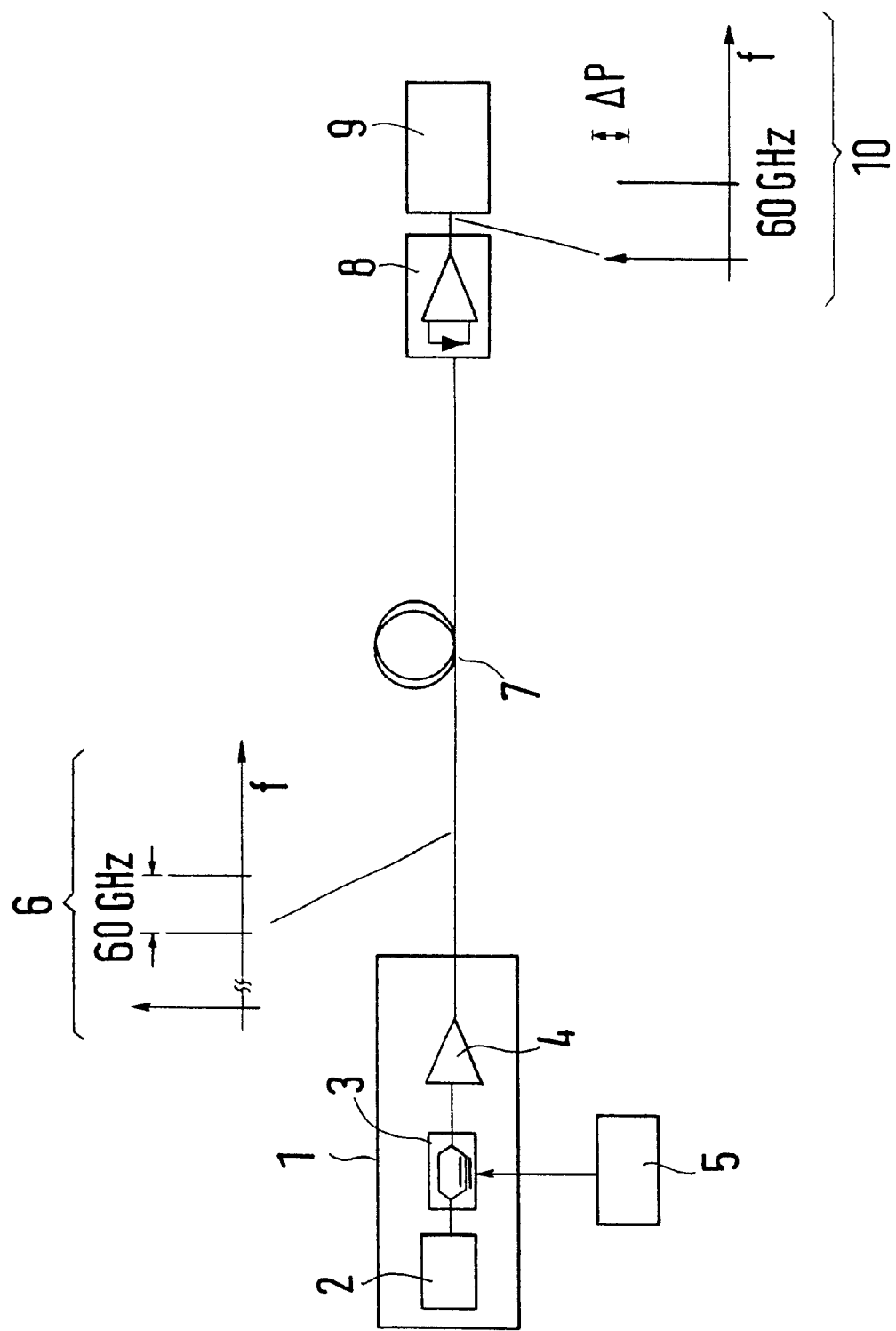

TRANSMISSION SYSTEM AND ASSOCIATED METHOD FOR MEASURING INTERFERENCE EFFECTS OF GLASS FIBER TRANSMISSION LINKS

This application is based on and claims the benefit of German Patent Application No. 198 27 638.9 filed Jun. 20, 1998, which is incorporated by reference herein.

BACKGROUND OF THE INVENTION

The invention is based on a method for measuring interference effects of a glass fiber transmission link as well as a transmission system according to the generic class of the independent claims. In Proceedings II, NOC '97, Antwerp, H. Bülow, pp. 65–72, the effects of polarization mode dispersion are described. Polarization mode dispersion occurs due to the birefringent effects in the glass fibers used for the transmission links. The light signal is divided into two components corresponding to the fast and the slow axes of the polarization states, whereby these two components are transmitted at different group velocities over the glass fiber link. The different group velocities of the two signal components cause interference and, in the general case, disturbance of the data information. The polarization mode dispersion effect is a statistical effect since the behavior of glass fibers varies due to their temperature, their state of strain, as well as due to aging effects. The change of the polarization mode dispersion is generally a slow process that takes place over longer periods. Consequently, it is not necessary to continuously measure the effects of polarization mode dispersion for a transmission link.

U.S. Pat. No. 5,473,457 discloses a method for measuring polarization mode dispersion. According to this method, the light signal is transmitted via a fiber and the polarization state is subsequently measured in a polarization controller. The signal is then supplied to a polarization maintaining fiber. The two polarization planes of the light are then separated in a device and coherently superimposed. The signal serves to calibrate the polarization controller. In this manner, the polarization state of the signal is actively influenced.

SUMMARY OF THE INVENTION

The inventive method for measuring interference effects caused by polarization mode dispersion with the characteristic features of the independent claim has the advantage, in contrast, that a simple measurement of an output signal comprising two frequency bands at a coherent receiver supplies a measure for the effects, which is available for further analysis. This method completely dispenses with the use of polarization controllers, as well as polarization measurements, and polarization maintaining fibers, all of which are optical components that cause great complexity and great costs. The method according to the invention makes possible a simple measurement of the characteristics of the transmission link by purely electric means.

The procedures set forth in the subclaims permit advantageous further embodiments and improvements of the method defined in the independent claim. Using this measuring method and using a high frequency, e.g. of 60 GHz, one can determine the polarization mode dispersion (PMD) at the receiver by means of a coherent measurement method. Advantageously, the method according to the invention is not used for the entire transmission period since polarization mode dispersion involves slow changes of the properties of the transmission link. It is therefore advantageous to use only one modulator, which as a measuring unit produces a side band modulated signal at least from time to time and thus delivers a signal that can be evaluated for the measurement.

A further advantage of the method is that it can be used online and thus permits a continuous transmission of the side band modulated signals for statistical recording and analysis.

The transmission system according to the invention, comprising an optical sender, a transmission link, and an optical receiver, has the advantage that one modulator produces the side bands for the measuring signal, while a second modulator processes the signals for the data. A further advantageous embodiment uses one modulator for both producing the side bands and for data modulation.

BRIEF DESCRIPTION OF THE DRAWING

An exemplary embodiment of the invention is depicted in the drawing and explained in further detail in the following description.

DETAILED DESCRIPTION OF THE INVENTION

FIG. 1 shows a transmission system according to the invention. An optical sender (1) is connected with a transmission link (7). In the optical sender (1) there is a laser (2) whose output is connected with the input of a modulator (3). The modulator (3) has an additional input, which is connected with an external oscillator (5). The output of the modulator (3) on the input side is coupled to an optical amplifier (4) whose output is connected with the transmission link (7). At the end of the transmission link (7) is a photodiode (8), possibly with electric amplifier, the output of which is connected to a PC (9). The optical source (1) is a laser (2), which produces two optical carriers with a frequency spacing of 60 GHz by means of double side band modulation, as shown at (6). By coherent detection, an electrical carrier is produced at 60 GHz on the photodiode (8) on the receiver side, as shown at (10). The power of this carrier at 60 GHz is a function of the polarization state of the two optical carriers or, more precisely, of the scalar product of the two fields. The polarization mode dispersion causes the polarization state of the fields in the two optical carriers to change. Thus, the electrical power detected in the receiver (9) also changes. Consequently, the detected power at the carrier frequency of 60 GHz is a measure for the change of the polarization mode dispersion on the transmission link. This simple measurement permits the detection of the momentary polarization mode dispersion of the transmission link as well as the analysis of the statistical behavior of the glass fiber link. The measured power is evaluated by a PC (9) and processed. This measurement method permits the time recording of changes in the polarization mode dispersion up to change frequencies greater than 1 MHz. The knowledge of the value of the polarization mode dispersion can be actively used for a compensating circuit in the receiver.

Prerequisite for a measurement is the use of two bands separated by a frequency f. These do not need not be equally polarized or have equal power. This is why two lasers can be used as optical sources. How the two bands are produced is not important. Only the frequency spacing between the bands is significant since the resolution of the PMD effect is better at high frequencies.

What is claimed is:

1. A transmission system comprising:

a glass fiber transmission link;

an optical sender comprising a light source for supplying two signals of different frequencies to said transmission link, and a coherent optical receiver for coherently detecting and evaluating said two signals at a frequency (f) which corresponds to a difference between the frequencies of said two signals, to thereby measure interference effects on said transmission link caused by polarization mode dispersion.

2. A transmission system according to claim 1, characterized in that said two signals are transmitted in the form of a sideband modulated signal, and the sender has one modulator (3) for producing the side bands and a second modulator for data modulation.

3. A transmission system according to claim 1, characterized in that said two signals are transmitted in the form of a sideband modulated signal and the sender (1) has one modulator both for producing the side bands and for data modulation.

4. A transmission system according to claim 1, characterized in that the optical sender has two lasers as sources for producing the two signals of different frequencies.

5. A measurement method, comprising:

(a) coupling two signals of an optical light source into a glass fiber transmission link, wherein the two signals have different frequencies;

(b) transmitting the two signals to a coherent receiver via the glass fiber transmission link; and (c) at the coherent receiver, evaluating a further signal to determine interference effects on the glass fiber transmission link, wherein the interference effects are caused by polarization mode dispersion of the two signals and wherein a frequency of the further signal corresponds to a difference between the different frequencies of the two signals.

6. The method of claim 5, further comprising:

(a) coupling a side band-modulated signal of the optical light source into the glass fiber transmission link;

(b) transmitting the side band-modulated signal to the coherent receiver via the glass fiber transmission link; and (c) at the coherent receiver, evaluating a still further signal whose frequency corresponds to a modulation frequency of the side band-modulated signal.

7. The method of claim 5, wherein the two signals are generated by two independent light sources.

8. The method claim 7, wherein the two signals are continually transmitted.

9. A method for transmitting data, comprising:

(a) at least in predetermined time intervals, generating two signals by an optical sender, wherein the optical sender is connected to at least one modulator;

(b) coherently superimposing the two signals to generate a coherently superimposed signal whose frequency corresponds to a frequency difference between the two signals; and (c) at a coherent receiver, measuring a power of the coherently superimposed signal to determine interference effects caused by polarization mode dispersion of the two signals and to calibrate a transmission system.

10. A measurement method, comprising:

(a) generating a first signal and a second signal having a first frequency and a second frequency, respectively;

(b) transmitting the first signal and the second signal; and (c) evaluating a third signal having a third frequency, which corresponds to a difference between the first frequency of the first signal and the second frequency of the second signal, to determine interference effects caused by polarization mode dispersion of the two signals.

11. The method of claim 10, wherein the first signal comprises a first side band signal of a fourth signal and wherein the second signal comprises a second side band signal of the fourth signal.

12. The method of claim 10, wherein, in the generating step, the first signal and the second signal are generated by two independent sources.

13. A determination method, comprising:

(a) transmitting a first signal and a second signal from a source to a receiver via a transmission link, wherein the first signal has a first frequency and the second signal has a second frequency;

(b) at the receiver, coherently detecting the first and the second signal and outputting a third signal whose frequency corresponds to a difference between the first frequency of the first signal and the second frequency of the second signal; and (c) measuring a power of the third signal to determine interference effects on the transmission link, which are caused by polarization mode dispersion of the first signal and of the second signal.

14. The method of claim 13, wherein the first signal comprises a first side band signal of a fourth signal and wherein the second signal comprises a second side band signal of the fourth signal.

15. The method of claim 13, wherein the first signal and the second signal are generated by two independent sources.

* * * * *